United States Patent [19]
Aystetten et al.

[11] 3,856,766
[45] Dec. 24, 1974

[54] PROCESS FOR THE MANUFACTURE OF A LIGHT COLORED THERMOSTABLE CHLORINATED POLYOLEFIN

[75] Inventors: Helmut Klug, Aystetten; Ambar Nath Mukerjee, Gersthofen, both of Germany

[73] Assignee: Hoechst Aktiengesellschaft, Frankfurt/Main, Germany

[22] Filed: Dec. 13, 1973

[21] Appl. No.: 424,226

[30] Foreign Application Priority Data
Dec. 21, 1972 Germany............................ 2262536

[52] U.S. Cl....... 260/88.2, 260/94.9 H, 260/96 HA, 260/93.7
[51] Int. Cl. ............................................ C08f 27/03
[58] Field of Search.......... 260/96 HA, 94.9 H, 88.2

[56] References Cited
UNITED STATES PATENTS

| | | | |
|---|---|---|---|
| 3,168,499 | 2/1965 | Orthner et al. | 260/79.3 |
| 3,227,781 | 1/1966 | Klug et al. | 260/897 |
| 3,813,370 | 5/1974 | Gambaretto et al. | 260/88.2 S |

*Primary Examiner*—Joseph L. Schofer
*Assistant Examiner*—A. L. Clingman
*Attorney, Agent, or Firm*—Connolly & Hutz

[57] ABSTRACT

A light colored thermostable chlorinated polyethylene, polypropylene or copolymer of ethylene with an α-olefin having three to six carbon atoms is obtained by chlorinating the polymer having a molecular weight in the range of from 20,000 to 2,000,000 with gaseous chlorine containing 0.01 to 1.5 % by weight of steam.

3 Claims, No Drawings

PROCESS FOR THE MANUFACTURE OF A LIGHT COLORED THERMOSTABLE CHLORINATED POLYOLEFIN

The present invention relates to a process for the manufacture of a light colored thermostable chloropolyolefin.

A great number of publications does exist concerning the chlorination of polyolefins. There have been described many variations of the chlorination process in solution, in suspension and in the solid state in a fluidized or moving bed.

In all processes it must be taken into account that the chlorination reaction is strongly exothermal, i.e., when contacted with chlorine the polyolefins may carbonize, burn, change their color or be damaged in another way. In the chlorination in a liquid medium it is not very difficult to control the heat balance, whereas in the fluidized bed or fluidized layer chlorination the dissipation of the reaction heat constitutes a very serious technical problem. Industrially less important processes dilute the product to be chlorinated with inert substances, for example pulverulent sodium chloride, talc, silicic acid and the like, but in practice it is preferred to use chlorine diluted with inert gases, such as nitrogen, carbon dioxide and hydrogen chloride. As fluidized layer or fluidized bed chlorinations are preferably carried out with circulation of the gases, hydrogen chloride formed in the reaction is generally used as inert fluidization or carrier gas to facilitate gas processing as far as possible.

It has been found that the quality as to color and thermostability of polymers and copolymers of ethylene and propylene chlorinated in the fluidized layer or fluidized bed is often unsatisfactory when the chlorination is carried out at a temperature near the melting point of the polymer and/or in the presence of large amounts of hydrogen chloride and/or polymers are used containing detectable double bonds.

It is the object of the present invention to carry out the fluidized layer or fluidized bed chlorination of homopolymers of ethylene or propylene and copolymers of ethylene in such a manner that products are obtained which have a satisfactory color and thermostability combined with the other desired properties.

The present invention therefore provides a process for the manufacture of a light colored thermostable chloropolyolefin by chlorinating pulverulent polyethylene, polypropylene or a copolymer of ethylene with a straight chain or branched α-olefin having from three to six carbon atoms, the polymer having a molecular weight in the range of from about 20,000 to 2,000,000, with gaseous chlorine in the fluidized layer or moving bed, which comprises carrying out the chlorination with gaseous chlorine containing 0.01 to 1.5% by weight of steam.

Suitable starting materials for the chlorination are pulverulent homopolymers of ethylene or propylene or copolymers of ethylene and straight chain or branched α-olefins having from three to six carbon atoms, such as propylene, n-butene and i-butene, n-pentene, n-hexene, in an amount of up to about 5% by weight, preferably 0.1 to 4% by weight. The particle size of the polymers is in the range of from about 40 to 500 microns, preferably 250 to 500 microns. They have been produced by high pressure, medium pressure or low pressure polymerization processes and have a molecular weight of from about 20,000 to 2,000,000. Low pressure polyethylenes to be chlorinated are preferably those having an eta-red value of from 0.5 to 20 dl/g, advantageously 1.0 to 5.0 dl/g, the latter range corresponding to a molecular weight of about 34,000 to 270,000.

The moist gaseous chlorine to be used in the process of the invention contains smaller or larger amounts of steam. In any case the content of steam is above the usual content of 10 to 20 ppm at 20° C. The chlorine gas may be partly or completely saturated with moisture, the degree of saturation being dependent on various factors such as chlorine temperature, temperature and type of the substance yielding the moisture. In general, the moisture content of the chlorine is in the range of from 0.01 to 1.5, preferably 0.1 to 1.0% by weight.

Various methods can be used to obtain chlorine having the required moisture content. The most simple way is to bubble the gaseous chlorine, before it enters the reactor, through water or aqueous hydrochloric acid. At a temperature of about 20° C of chlorine gas and moistening agent, about 0.5% by weight of water are absorbed by the gas. Alternatively, gaseous chlorine and steam can be introduced into the reactor tube either as a mixture or separately. It is likewise possible to introduce the required amount of moisture into the system with the aid of a carrier gas.

When choosing the material for the chlorination apparatus it must be taken into account that moist chlorine has a strong corroding action.

The chlorination is carried out in known manner in the fluidized or moving bed at a temperature, depending on the nature of the polymer, in the range of from 20° to 160° C, preferably 60° to 145° C. The reaction mixture is kept in motion by the reaction gas possibly diluted with inert gas and/or mechanically.

The chlorination may also be effected by a percussive fluidized bed process in which the reaction gas, optionally diluted with an inert gas, is passed through the loose pulverulent material to be chlorinated at a speed which is insufficient for fluidization and fluidization is brought about by introducing an inert gas in percussions separately from the reaction gas. In this process the reaction gas is preferably supplied from above and the inert gas is blown in percussively from below and during the intervals between the individual percussions the off gas is withdrawn from below the reaction space (cf. German Offenlegungsschriften 1,667,048 and 1,811,059). It is also possible to carry out a fluidized bed chlorination in the presence of readily vaporizable liquids which are resistant towards chlorine and evaporate at a temperature of from −50° to +80° C, for example carbon tetrachloride, fluorinated derivatives of halogenated methanes or ethanes or liquid chlorine (cf. German Offenlegungsschrift 2,151,138). Polyolefins having been subjected to a thermal pre-treatment for 5 to 300 minutes in the absence of oxygen at a temperature which is approximately 2° to 20° C below the crystallite melting point of the polymer can also be used (cf. German Offenlegungsschrift 1,720,800). Optionally, the thermal pre-treatment can be carried out in the presence of a solid, for example silicic acid. The polyolefins can also be chlorinated in admixture with solid substances such as talc, silica gel, barium sulfate, polyvinyl chloride, polyfluorohydrocarbons, and the like. Another known chlorination process is effected in the presence of high energy ionizing radiation or substances yielding radicals, for example peroxides, azonitriles and the like. The chlorination can be carried out discontinuously as well as continuously, without pressure or under pressure.

In general, the products obtained by the process of the invention contain 10 to 50% by weight, preferably 25 to 45% by weight of chlorine.

The chlorination according to the invention with moist chlorine is especially suitable when operating at a temperature in the viscinity of the melting range of the polymer to obtain preponderantly amorphous chlorination products having especially interesting technological properties, which are used, for example, as plasticizers for polyvinyl chloride compositions and as synthetic rubbers. The process of the invention has the further advantage that no undesired foreign substances are contained in the final product.

The products obtained in the process of the invention differ from chlorination products obtained by known processes and having a tendency to color in that they have a very light color and that they keep that color even after processing at high temperature. Their thermostability is not detrimentally affected, on the contrary it is slightly improved.

The following examples illustrate the invention.

EXAMPLE 1

A vertical glass tube having a diameter of 80 mm and a height of 1,000 mm, into which a gas-permeable porous plate was inserted in the lower part, was used as chlorination reactor. Approximately 100 mm above the plate equipment to measure the temperature was installed in the reaction space and close by a closable tube through which, for example antistatic agents, could be blown in. The apparatus was surrounded by a jacket for heating or cooling.

600 Grams of low pressure polyethylene having an eta red value of 1.2 dl/g, a particle size of 40 to 800 microns, a latent heat of fusion of 42.0 cal/g according to differential thermoanalysis (DTA), and an ultimate melting point of 136° C, were subjected to a heat treatment by heating in a nitrogen current to about 122° C during the course of 105 minutes and keeping at that temperature for 15 minutes. After cooling the polyethylene powder was filled into the chlorination reactor and chlorinated with fluidization with a mixture consisting of 1 part by volume of chlorine, which had been passed through a wash bottle containing distilled water kept at 20° to 22° C, and 4 parts by volume of hydrogen chloride, whereby the temperature rose from 20° to 50° C within 15 minutes. At 50°C and after having reached an internal temperature of 80° C each time 0.25 gram of finely dispersed silicic acid were blown into the reaction mixture through the closable tube to avoid the formation of deposits on the wall of the chlorination tube. After a chlorination period of 3 hours altogether, during the course of which the chlorination temperature had been gradually raised to 137° C, the reaction product was blown out and cooled with nitrogen. A pure white powder having a chlorine content of 36.7% was obtained. The amount of water blown in with the gaseous chlorine was 0.42% by weight, calculated on the amount of chlorine passed through.

COMPARATIVE EXAMPLE

The chlorination was carried out as described above but with dry chlorine. The chlorination product having a chlorine content of 36.4% by weight was yellow.

EXAMPLE 2

670 Grams of low pressure polyethylene having an eta red value of 4.2 dl/g, a particle size of 40 to 500 microns, a latent heat of fusion of 45.2 cal/g and an ultimate melting point of 140° C, were chlorinated under the conditions of Example 1. The final chlorination temperature was 143° C.

The chlorinated product had a chlorine content of 41.9% by weight and showed a white color. The amount of water blown in with the gaseous chlorine was 0.52% by weight, calculated on the amount of chlorine passed through.

COMPARATIVE EXAMPLE

Polyethylene as used in Example 2 was chlorinated under the conditions specified in that example but without the addition of water. The final chlorination temperature was 143° C. The chlorination product had a chlorine content of 41.6% by weight and a brownish yellow color.

The following Table indicates the essential properties of the chlorination products. The color was determined visually and with a spectrophotometer according to DIN 5033 with a rolled sheet 1 mm thick of a stabilized mixture of 30 grams of the respective chloropolyolefin and 180 grams of suspension polyvinyl chloride. The thermostability was measured by rolling a mixture of 40 grams of chloropolyolefin, 160 grams of suspension polyvinyl chloride and 2 grams of stabilizer (barium-cadmium laurate) until black stripes of decomposition occurred. The double bonds in the starting material were determined by infrared spectroscopy.

Table

| Example No. | starting material type[1] | double bonds[2] a | b | c | chlorination product color[3] visually | with spectrophotometer | thermostability (min) | % Cl by weight |
|---|---|---|---|---|---|---|---|---|
| 1 | I | 0 | b | c | white | 11 | 43 | 36.7 |
| comparison | I | 0 | b | c | yellow | 27 | 41 | 36.4 |
| 2 | II | a | b | c | white | 13 | 38 | 41.9 |
| comparison | II | a | b | c | yellow brown | >28 | 28 | 41.6 |

Referring to the Table:
[1] I = low pressure polyethylene eta red 1.2 dl/g
II = low pressure polyethylene eta red 4.2 dl/g
[2] a = transvinylene groups    c = vinylidene groups
b = vinyl groups    0 = none
[3] classification: 1 = white; 20 = yellowish

What is claimed is:

1. A process for the manufacture of a light colored thermostable chloropolyolefin by chlorinating pulverulent polyethylene, polypropylene or a copolymer of ethylene with a straight chain or branched α-olefin having 3 to 6 carbon atoms, the molecular weight of the polymer being in the range of from about 20,000 to 2,000,000, with gaseous chlorine in a fluidized or moving bed, which comprises carrying out the chlorination with gaseous chlorine containing 0.01 to 1.5% by weight of steam.

2. The process of claim 1, wherein the polyolefin is subjected to a thermal treatment prior to chlorination.

3. The process of claim 1, wherein the content of steam of the gaseous chlorine is adjusted by means of water or aqueous hydrochloric acid.

* * * * *